United States Patent [19]

Breslau

[11] Patent Number: 4,497,127
[45] Date of Patent: Feb. 5, 1985

[54] PHOTOGRAPHIC SLIDE SORTER

[75] Inventor: Steven M. Breslau, Evanston, Ill.

[73] Assignee: Sima Products Corporation, Chicago, Ill.

[21] Appl. No.: 483,165

[22] Filed: Apr. 8, 1983

[51] Int. Cl.³ ............................................. G02B 27/02
[52] U.S. Cl. ...................................... 40/367; 40/564
[58] Field of Search ................. 40/361, 362, 367, 100, 40/564

[56] References Cited

U.S. PATENT DOCUMENTS 2,816,379 12/1957 Ensor ................................. 40/152.2
2,908,094 10/1959 Mast ..................................... 40/367
4,249,329 2/1981 Lamb .................................... 40/361

Primary Examiner—Gene Mancene
Assistant Examiner—Wenceslao J. Contreras
Attorney, Agent, or Firm—Silverman, Cass & Singer, Ltd.

[57] ABSTRACT

A photographic slide sorting and handling device for retaining a plurality of slides to be viewed and sorted upon a translucent surface with a source of illumination below the surface. A plurality of channel-shaped support members is affixed to the support surface in parallel spaced disposition. Each support member includes a respective slot and resting surface spaced above the slot. The slot of each support member is adapted for receipt therein of an edge of a photographic slide with the opposite edge of the slide engaged against the resting surface of a next adjacent support member. The slides are retained between adjacent support members so as to permit them to be slipped in and out of the slots and freely moved along the support members during sorting of the slides but prevented from falling out of the slots if the sorter is jostled.

6 Claims, 6 Drawing Figures

PHOTOGRAPHIC SLIDE SORTER

BACKGROUND OF THE INVENTION

1. Field of the Invention

This invention relates generally to photographic slide sorting and handling devices and, more particularly, to such a device in which the slides are supported thereon in a manner which will prevent the same from falling off of the device if the sorter accidentally is jostled.

2. Description of the Prior Art

Photographic slide sorting and handling devices commonly are used to enable a person to display 35 mm. photographic slides above a source of light so that the slides can be examined and sorted as desired. Various types of such devices are known which provide a generally planar surface upon which the slides to be sorted can be arranged and moved around conveniently by the user as he views and sorts the slides.

The slide sorting and handling operation to be accomplished with devices of which the present invention is concerned is such that it is desirable that the devices permit convenient positioning on and removal from the surface upon which the slides are retained so that the user can arrange and rearrange the slides with little effort. Although it is desired that the slides be retained on the device in a manner to be moved about easily, it also is desired that the slides be supported and retained in a manner which will prevent them from falling off of or away from the sorting device if the same accidentally is jostled such as by being bumped or jarred during the sorting operation.

It is known to provide photographic slide sorting and handling devices which enable convenient display and arrangement of slides. Such prior art devices usually provide a rest surface against which the slides can be positioned and moved about. In use of such devices, the slides easily are separated from the sorting device upon accidental jarring thereof because they are not retained in any positive manner upon the device.

It also is known to provide photographic slide sorting and handling devices in which the slides are firmly retained on the device by structure which is such as to prevent any movement of the slides if the device is jostled. The disadvantage of such devices is that the slides are not easily moved about or withdrawn from the device for rearrangement by the user.

Photographic slide sorting and handling devices of the type described above are illustrated in the following patents:

|           |           |
| --------- | --------- |
| 2,908,094 | 3,508,355 |
| 3,184,585 | 4,152,852 |
| 3,200,523 | 4,207,979 |
| 3,419,984 | 4,226,038 |

Although these patents describe various types of photographic slide sorting and handling devices which permit display and sorting of slides by the user, none of the patents shows a device in which the slides are retained above an illumination device in a manner to permit the same to be relocated easily without hindrance and yet so as to prevent the slides from falling off of or away from the sorter if the same accidentally is jostled.

The device of the present invention provides photographic slide retaining members effective to retain the slides on the device for easy positioning and rearrangement during sorting thereof and yet which support such slides in a manner to prevent the same from falling off of or away from the device if the sorter unintentionally is jarred or jostled during use thereof.

SUMMARY OF THE INVENTION

The invention is characterized by a plurality of channel-shaped slide support members arranged in parallel spaced disposition above a translucent surface with a light source below to spread light evenly to illuminate the slides. Each support member includes a respective slot and resting surface spaced above the slot. The slot of each support member is adapted for receipt therein of an edge of a photographic slide with the opposite edge of the slide engaged against the resting surface of the next adjacent support member. The dimensions of the slot of each support member are such as to permit selected slides conveniently to be inserted into the slot and freely moved along the support members during sorting of the slides but prevented from falling out of the slots if the device is jostled or otherwise accidentally moved during use thereof.

DESCRIPTION OF THE PREFERRED EMBODIMENTS

Figure 1:
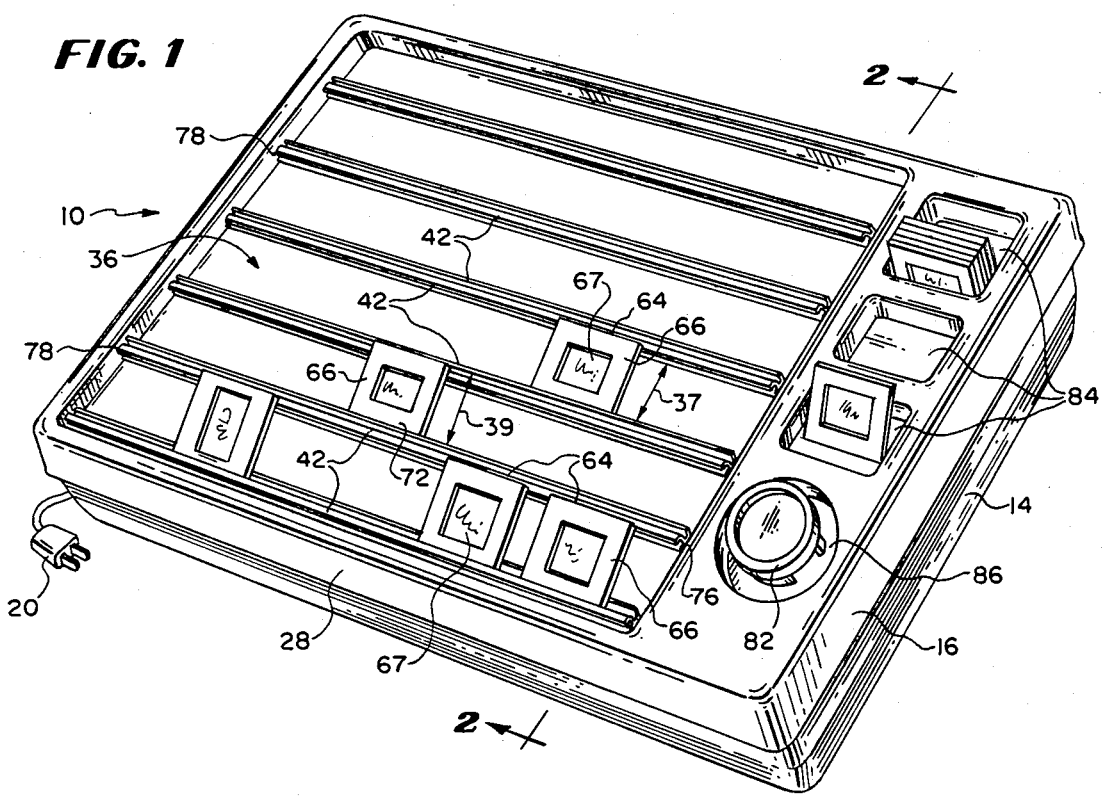
FIG. 1 is a perspective view illustrating the photographic slide sorter of the invention with photographic slides arranged randomly thereon.
Figure 2:
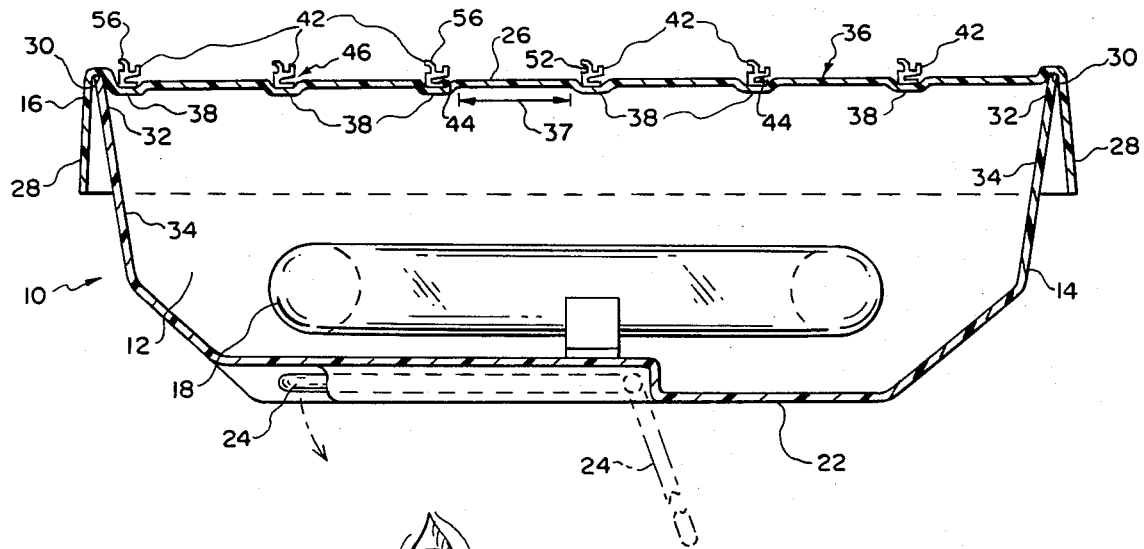
FIG. 2 is a sectional view taken along the line 2—2 of FIG. 1 in the direction indicated generally.

As seen in FIGS. 1 and 2, the photographic slide sorter 10 of the invention includes a generally rectangular light compartment 12 comprising an upwardly facing tray portion 14 and a cover portion 16 for positioning over the tray portion 14 to form the light compartment 12 between the two portions 16 and 14. A source of illumination, such as circular fluorescent bulb 18, is positioned within the light compartment 12 with electric plug 20 provided for supplying electric current to the light source 18.

The tray portion 14 has a generally planar rest surface 22 to permit positioning of the sorter 10 on a flat surface during use thereof. A pivotally mounted foot member 24 is provided in a depression formed in rest surface 22 for selective movement into the position shown in dotted line in FIG. 2 to enable the sorter to be propped up upon a flat surface for use of the device disposed at a generally acute angle to such surface, as desired. The surface 22 also may be provided with means (not shown) to secure the same against a wall surface for mounting of the device in a vertical orientation during use thereof, if desired.

The cover portion 16 preferably is formed of generally translucent material to permit the illumination from light source 18 to pass therethrough. Cover portion 16 has a generally flat surface 26 with integrally formed skirt part 28 depending from the periphery thereof. A depression 30 is formed between the periphery of cover portion 16 at the location where skirt part 28 is joined thereto and is adapted to receive the terminal edges 32 of walls 34 of tray portion 14 therein upon positioning of cover portion 16 upon tray portion 14. As illustrated in FIG. 2, cover portion 16 is retained upon tray portion 14 by positioning the same over the tray portion with terminal edges 32 of walls 34 retained in depression 30 of the cover portion 16. In this manner, cover portion 16 may easily be separated from tray portion 14 for purposes of cleaning or servicing the device or changing the bulb 18 as required.

Cover portion 16 preferably is vacuum formed from plastic or other similar translucent material with a large, generally rectangular shaped depression 36 formed therein. Depression 36 is provided with a plurality of parallel spaced troughs 38 extending the length of the depression 36. There are six such equally spaced, parallel arranged troughs in the embodiment shown in the drawings.

Each trough 38 has secured thereto by adhesive 40 or other suitable means an identical channel-shaped support member 42 extending along the entire length of its respective trough. Each channel-shaped member 42 is formed with a slot 44 of generally C-shaped cross-sectional configuration. The mouth 46 of each slot 44 is defined by a bottom wall 48 disposed generally parallel to flat surface 26 of cover portion 16 and a top wall 50 in spaced relationship to the bottom wall 48 but at a generally acute angle with respect thereto.

Each channel-shaped member 42 also includes a second slot 52 of generally C-shaped cross-sectional configuration having a mouth 54 which opens in a direction opposite to that of the mouth 46 of slot 44. A rest surface 56 projects above slot 52 to define the upper wall 58 thereof. A third slot 60 of generally C-shaped cross-sectional configuration is formed in each channel member with a mouth 62 opening generally upwardly and orientated normal with respect to the mouth 46 of slot 44.

The cross-sectional dimensions of slot 44 are such as to permit a 35 mm. photographic slide 64 with convention mounting border 66 secured about transparency 67 to be positioned in the slot as shown in the drawings with only the border portions 66 and not the transparency portion 67 of the slide covered by the walls of the slot. The depth 68 of the slot 44 is of a dimension sufficient to permit slide 64 to be inserted into the slot and removed easily therefrom. The width 70 of slot 44 is of a dimension sufficient to permit slide 64 to be inserted into the slot and retained relatively securely therein but still be easily removable therefrom as desired. (See FIG. 3)

Figure 4:
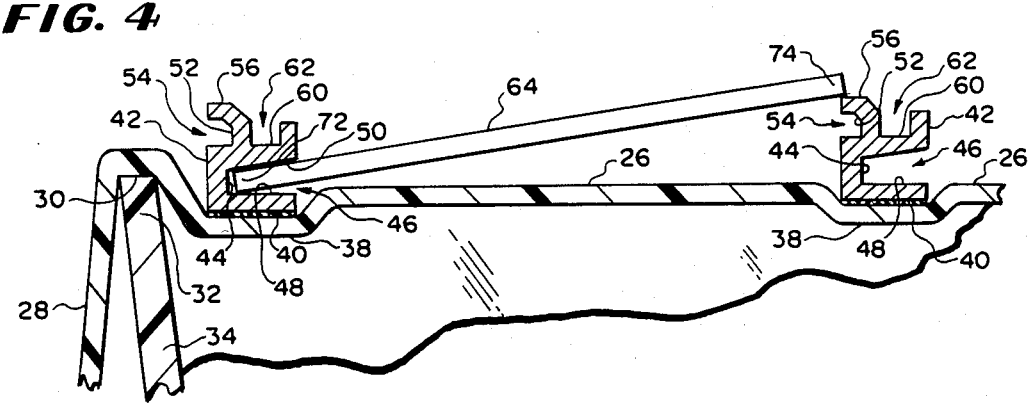
FIG. 4 is an enlarged sectional view taken through the support surface and support members of the invention showing a photographic slide retained thereon.

The dimensional spacing 37 between troughs 38 with support members 42 secured thereabove is approximately equal to the transverse dimension 39 of the slide border 66. The spacing 37 is such that one edge 72 of a slide 64 with border 66 may be positioned within slot 44 with the opposite edge 74 of the slide supported against resting surface 56 of the next adjacent support member 42, as seen in FIG. 4. The slide 64 is positionable in the disposition illustrated in FIG. 4 by insertion of the border part 66 into the slot 44 with the opposite edge 74 disposed against resting surface 56. When so arranged, one or more slides 64 may be positioned upon the slide sorter 10 and moved about the sorter as desired by the user. The slides are sufficiently supported by support members 42 to prevent the same from falling out of the slots 44 if the sorter accidentally is moved or jostled during use. In this manner, the slide sorter 10 features generally "spill proof" characteristics. The dimensional configuration and disposition of support members 42 is such as to permit slides to be slipped in and out of slots 44 and ride along the slots, but prevented from accidentally falling out of or otherwise leaving the same.

Figure 5:
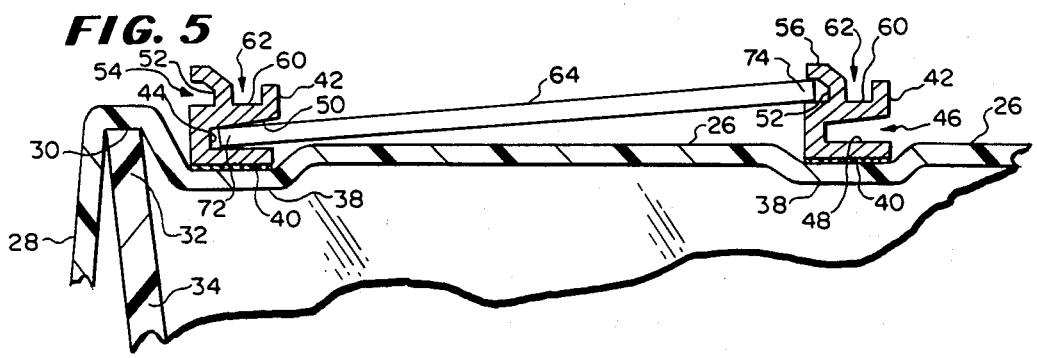
FIG. 5 is an enlarged sectional view taken through the support surface and support members of the invention showing a photographic slide retained thereon in an alternate position.
Figure 6:
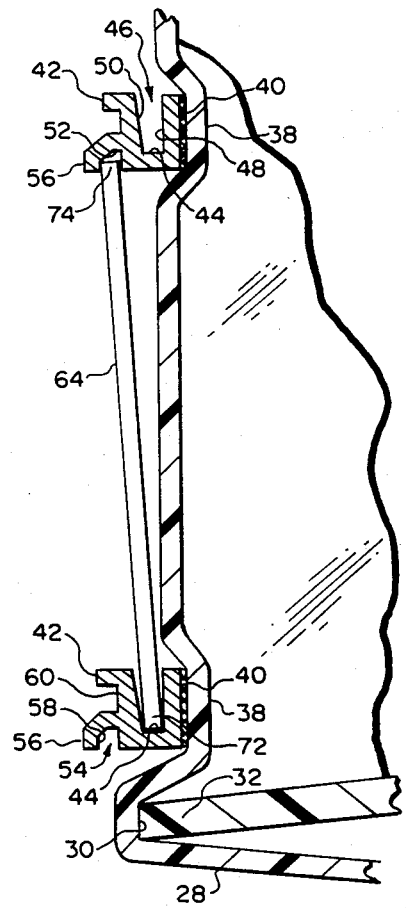
FIG. 6 is an enlarged sectional view similar to that of FIG. 5 illustrating the manner of positioning a photographic slide upon the slide sorter in vertical disposition thereof.

If desired, slides 64 may be positioned upon support members 42 in the manner illustrated in FIGS. 5 and 6 in which the slides are positioned between adjacent support members 42 by inserting opposite edges 72, 74 of respective slides into respective slots 44, 52. The insertion of the slides in the disposition shown in FIGS. 5 and 6 is achieved by movement thereof from either of open edges 76, 78 of the respective support members 42. When the slides 64 are positioned upon the slide sorter in the manner shown in FIGS. 5 and 6, the slides may be moved along support members 42 but cannot be interchanged or rearranged without sliding the same out of slots 44, 52. Thus, although the slides are retained securely and cannot be dislodged from the support members 42, the convenience of movement of the slides into and out of slot 44 which is obtained when the device is used as shown in FIG. 4 is not retained. When the slides 64 are positioned upon the sorter 10 as shown in FIG. 5, the sorter may be mounted to a wall surface for display of the slides in vertical orientation as shown without any possibility of the slides falling out of the two slots 44, 52.

Figure 3:
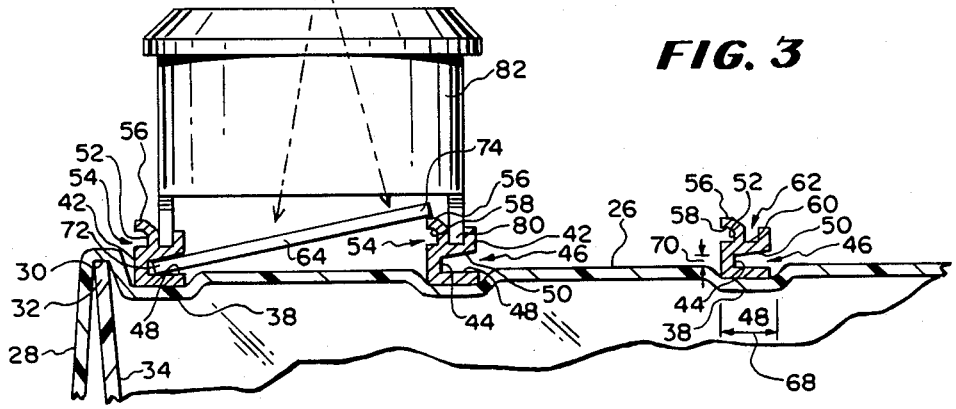
FIG. 3 is an enlarged sectional view taken through the support surface and support members of the invention showing an eye viewer positioned upon said support members for examining a slide positioned thereon.

Adjacent upwardly facing slots 60 of support members 42 are provided for receipt of the legs 80 of a manifying glass eye viewer or loupe 82 as shown in FIG. 3 The slots 60 permit loupe 82 to be positioned above selected slides 64 and moved along members 42 for convenient examination of the slides by the user, as desired. Cover portion 16 may be provided with additional depressions or wells 84, 86 to function as slide holding and/or accessory retaining compartments as shown in FIG. 1.

Minor variations in the structure and other variations in the arrangement and size of the various parts may occur to those skilled in the art without departing from the spirit or circumventing of the scope of the invention as set forth in the appended claims.

I claim:

1. A photographic slide sorting and handling device for retaining a plurality of rectangular-shaped slides to be viewed and sorted upon a surface comprising, a sorting surface having a generally rectangular shaped depression formed therein, a plurality of parallel spaced troughs formed in and extending the elongate length of said depression, a plurality of elongate channel shaped slide support members arranged in parallel spaced disposition above said sorting surface and being secured to said sorting surface at the location of said troughs, each said slide support member including a respective slide-receiving slot formed along the elongate length thereof, said slide-receiving slot being of generally C-shaped cross-sectional configuration with a mouth defined by a bottom wall disposed generally parallel to said sorting surface and a top wall disposed in spaced relationship to said bottom wall but at a generally acute angle with respect thereto, a slide resting surface formed on each support member spaced above said slide-receiving slot and extending along the elongate length thereof, said slide resting surface being defined by the top wall of said slide-receiving slot, the slide-receiving slot of each support member being adapted for receipt therein of an edge of a photographic slide with the opposite edge of the slide engaged against the resting surface of the next adjacent support member, the dimensions of the slide-receiving slot of each support member being such as to permit selected slides to be inserted into said slot and freely moved along the support members during sorting of the slides but prevented from falling out of the slide-receiving slot if the device is jostled or otherwise accidentally jarred during use thereof.

2. A device as claimed in claim 1 in which said sorting surface is formed of generally translucent material and there is a source of illumination below the sorting surface.

3. A device as claimed in claim 2 in which said sorting surface includes a skirt part depending from the periphery thereof, a depression formed between said periphery and the skirt part, and a tray portion with upstanding walls adapted for receipt within said depression.

4. A device as claimed in claim 1 in which each said slide support member includes a respective upwardly facing slot, said slots being of generally C-shaped cross-sectional configuration, the respective slots having a mouth defined by the walls thereof, the mouth of said upwardly facing slots opening generally normal with respect to the mouths of said slide-receiving slots, said upwardly facing slots being adapted for receipt therein of leg parts of a viewing loupe to be moved along the support members for examination of the slides retained thereon.

5. A device as claimed in claim 1 in which said sorting surface is provided with slide holding and accessory retaining compartments.

6. A photographic slide sorting and handling device for retaining a plurality of rectangular-shaped slides to be viewed and sorted upon a surface comprising, a sorting surface having a generally rectangular shaped depression formed therein, a plurality of parallel spaced troughs formed in and extending the length of said depression, a plurality of elongate channel shaped slide support members arranged in parallel spaced disposition above said sorting surface and being secured to said sorting surface at the location of said troughs, each said slide support member including a respective slide-receiving slot formed along the elongate length thereof, said slide-receiving slot being of generally C-shaped cross-sectional configuration with a mouth defined by a bottom wall disposed generally parallel to said sorting surface and a top wall disposed in spaced relationship to said bottom wall but at a generally acute angle with respect thereto, said slide support member further including a respective second slot of generally C-shaped cross-sectional configuration, said second slot having a mouth which opens in a direction opposite to that of the mouth of said slide-receiving slot, a slide resting surface formed on each support member spaced above said slide-receiving slot and extending along the elongate length thereof, the slide-receiving slot of each support member being adapted for receipt therein of an edge of a photographic slide with the opposite edge of the slide disposed in said second slot of the next adjacent support member.

* * * * *